US012570573B2

(12) United States Patent
    Dragic et al.

(10) Patent No.: US 12,570,573 B2
(45) Date of Patent: Mar. 10, 2026

(54) OPTICAL FIBER FOR TEMPERATURE SENSING, AND SYSTEM AND METHOD FOR MEASURING TEMPERATURE

(71) Applicants: The Board of Trustees of the University of Illinois, Urbana, IL (US); Clemson University, Clemson, SC (US)

(72) Inventors: Peter Dragic, Champaign, IL (US); Alexander Pietros, Champaign, IL (US); John Ballato, Clemson, SC (US); Maxime Cavillon, Bourg la Reine (FR)

(73) Assignees: THE BOARD OF TRUSTEES OF THE UNIVERSITY OF ILLINOIS, Urbana, IL (US); CLEMSON UNIVERSITY RESEARCH FOUNDATION, Clemson, SC (US)

( * ) Notice: Subject to any disclaimer, the term of this patent is extended or adjusted under 35 U.S.C. 154(b) by 391 days.

(21) Appl. No.: 18/237,658

(22) Filed: Aug. 24, 2023

(65) Prior Publication Data

US 2024/0068887 A1 Feb. 29, 2024

Related U.S. Application Data

(60) Provisional application No. 63/401,823, filed on Aug. 29, 2022.

(51) Int. Cl.
 *C03C 13/04* (2006.01)
(52) U.S. Cl.
 CPC .................................... *C03C 13/04* (2013.01)

(58) Field of Classification Search
 CPC ........ C03C 13/04; C03C 3/06; G01K 11/3213
 See application file for complete search history.

(56) References Cited

U.S. PATENT DOCUMENTS

| | | | |
|---|---|---|---|
| 4,708,494 A | 11/1987 | Kleinerman | |
| 5,290,103 A * | 3/1994 | Fevrier | G01K 11/32 |
| | | | 374/161 |
| 10,673,197 B2 * | 6/2020 | Kliner | H01S 3/121 |

OTHER PUBLICATIONS

Ballato, J., et al., "Perspective: Molten core optical fiber fabrication—A route to new materials and applications," APL Photonics 3, 120903, (2018), pp. 1-15.

(Continued)

*Primary Examiner* — Seung C Sohn
(74) *Attorney, Agent, or Firm* — Crowell & Moring LLP

(57) ABSTRACT

A method of measuring temperature includes positioning an optical fiber in contact with an object or in an environment having a temperature to be determined, where the optical fiber comprises a core surrounded by a cladding; the core comprises an alkaline-earth fluorosilicate glass including defects, and the cladding comprises a silica glass. Infrared light is supplied to the optical fiber, thereby electronically exciting the defects. Green light emitted from the defects is detected, and an intensity value of the green light is obtained and converted to a temperature value for the optical fiber, whereby the temperature of the object or environment is determined. The green light may be detected along a length of the optical fiber, and a plurality of intensity values may be converted to a plurality of temperature values along the fiber length, thereby obtaining a distributed measurement of the temperature of the object or environment.

20 Claims, 13 Drawing Sheets
(6 of 13 Drawing Sheet(s) Filed in Color)

(56) References Cited

OTHER PUBLICATIONS

Bradac, Carlo, et al., "Optical Nanoscale Thermometry: From Fundamental Mechanisms to Emerging Practical Applications," *Advanced Optical Materials*, 8 (15), 2000183 (2020), pp. 1-29.

Bricchi, Erica, et al., "Extraordinary stability of anisotropic femtosecond direct- written structures embedded in silica glass," *Appl. Phys. Lett.* 88 (11), 111119 (2006), pp. 1-4.

Bu, Y. Y., et al., "Optical temperature sensing behavior of $Dy^{3+}$-doped transparent alkaline earth fluoride glass ceramics," *Appl. Phys. A*, 123 (5) (2017), pp. 1-8.

Chandonnet, Alain, et al., "Photodegradation of fluoride glass blue fiber laser," *Proc. SPIE 2998, Photosensitive Optical Materials and Devices* (1997), pp. 1-13.

Chen, Daqin, et al., "Dual-Phase Glass Ceramic: Structure, Dual-Modal Luminescence, and Temperature Sensing Behaviors," *ACS Appl. Mater. Interfaces*, 7 (34), (2015), pp. 19484-19493.

Chen, Daqin, et al., "Optical spectroscopy of $Cr^{3+}$-doped transparent nano-glass ceramics for lifetime-based temperature sensing," *Optics Letters*, 40 (15) (2015), pp. 3607-3610.

Chen, Daqin, et al., "Upconverting luminescence based dual-modal temperature sensing for $Yb^{3+}/Er^{3+}/Tm^{3+}$ nanocrystals embedded glass ceramic," *Journal of the European Ceramic Society*, 37 (2017), pp. 4939-4965.

Chen, WeiPing, et al., "$Sr_2GdF_7$:$Tm^{3+}/Yb^{3+}$ glass ceramic: A highly sensitive optical thermometer based on FIR technique," *Journal of Alloys and Compounds 735*, (2018), pp. 2544-2550.

Ding, Qi, et al., "Temperature dependent photoluminescence of composition tunable $Zn_xAgInSe$ quantum dots and temperature sensor application," *Optics Express* 25 (16) (2017), pp. 1-12.

Dragic, P., et al., "Brillouin spectroscopy of a novel baria-doped silica glass optical fiber," *Optics Express*, 21 (9) (2013), pp. 1-18.

Dramicanin, Miroslav, D., "Trends in luminescence thermometry," *Journal of Applied Physics* 128, 040902, (2020), pp. 1-19.

Fournier, J., et al., "Evidence of a green luminescence band related to surface flaws in high purity silica glass," *Optics Express*, 18 (21) (2010), pp. 1-10.

Gebavi, Hrvoje, et al., "Photobleaching of photo darkening in ytterbium doped aluminosilicate fibers with 633 nm irradiation," *Optical Materials Express*, 2 (9) (2012), pp. 1286-1291.

Griscom, David L., et al., "Determination of the visible range optical absorption spectrum of peroxy radicals in gamma-irradiated fused silica," *Journal of Non-Crystalline Solids 239*, (1998), pp. 66-77.

Griscom, David L., "Optical Properties and Structure of Defects in Silica Glass," *The Centennial Memorial Issue of The Ceramic Society of Japan*, (1991), pp. 923-942.

Haupt, Florian, et al., "Single Quantum Dot as an Optical Thermometer for Millikelvin Temperatures," *Phys. Rev. Applied* 2 (2), 024001 (2014), pp. 1-8.

Huang, Kun, et al., "Theory of light absorption and non-radiative transitions in F-centres," *Proc. R. Soc. Lond. A 204 (1078)* (1950), pp. 406-423.

Kenney, John W. III, et al., "Photoluminescent Metal Complexes and Materials as Temperature Sensors—An Introductory Review," *Chemosensors*, 9 (109) (2021), pp. 1-22.

Koponen, J. J., et al., "Measuring photodarkening from single-mode ytterbium doped silica fibers," *Optics Express*, 14 (24) 11539 (2006), pp. 1-6.

Kumbhakar, Partha, et al., "Reversible temperature-dependent photoluminescence in semiconductor quantum dots for the development of a smartphone-based optical thermometer," *Nanoscale*, 13, (2020), pp. 2946-2954.

Lojpur, V., et al., "Temperature sensing from the emission rise times of $Eu_{3+}$ in $SrY_2O_4$ ," *Royal Society of Chemistry, Phys. Chem. Chem. Phys.*, 16, 25636 (2014), pp. 1-6.

Masters, B. R., "Three-dimensional microscopic tomographic imaging of the cataract in a human lens in vivo," *Optics Express*, 3 (9) 332 (1998), pp. 1-7.

Pacchioni, G et al., "Optical Properties of Defects in Silica," in *Defects in $SiO_2$ and Related Dielectrics: Science and Technology*, eds. G. Pacchioni et al. Springer Science+Business Media, B.V. (2000) pp. 73-116.

Skuja, L. et al., "Effects of temperature on electron paramagnetic resonance of dangling oxygen bonds in amorphous silicon dioxide," *IOP Conf. Ser.: Materials Science and Engineering*, 23, 012016 (2011), pp. 1-7.

Souza, Adelmo S., et al., "Highly-Sensitive $Eu^{3+}$ ratiometric thermometers based on excited state absorption with predictable calibration," *Nanoscale*, 8 (2016), pp. 5327-5333.

Stoneham, A. M., "Theory of Defects in Solids: Electronic Structure of Defects in Insulators and Semiconductors," Ch. 10, Optical Properties, *Oxford Classic Texts in the Physical Sciences* (2001), pp. 271-341.

Uchiyama, H., et al., "Fiber-optic thermometer using Cr-doped YAlO3 sensor head," *Rev Sci Instrum* 74 (8) (2003), pp. 3883-3885.

Vaccaro, L., et al., "Phonon coupling of non-bridging oxygen hole center with the silica environment: Temperature dependence of the 1.9 eV emission spectra," *Journal of Luminescence*, 128, (2008), pp. 1132-1136.

Xu, Wei, et al., "Highly sensitive optical thermometry through thermally enhanced near infrared emissions from $Nd^{3+}/Yb^{3+}$ codoped oxyfluoride glass ceramic," *Sensors and Actuators B 178*, (2013) pp. 520-524.

Xu, Wei, et al., "Short-wavelength upconversion emissions in $Ho^{3+}/Yb^{3+}$ codoped glass ceramic and the optical thermometry behavior," *Optics Express*, 20 (16) 18127, (2012), pp. 1-13.

Yablon, Andrew D., "Multi-Wavelength Optical Fiber Refractive Index Profiling by Spatially Resolved Fourier Transform Spectroscopy," *Journal of Lightwave Technology*, 28 (4) (2010), pp. 360-364.

Yu, Huan, et al., "Optical thermometry based on up-conversion emission behavior of $Ba_2LaF_7$ nano-crystals embedded in glass matrix," *Journal of Luminescence* 194, (2018), pp. 433-439.

Zhong, Jiasong, et al., "A review on nanostructured glass ceramics for promising application in optical thermometry," *Journal of Alloys and Compounds*, 763 (2018), pp. 34-48.

* cited by examiner 100,300

104
102

BaF$_2$ POWDER CORE

SILICA CLADDING

ACRYLATE BUFFER

OPTICAL FIBER FOR TEMPERATURE SENSING, AND SYSTEM AND METHOD FOR MEASURING TEMPERATURE

RELATED APPLICATION

The present patent document claims the benefit of priority to U.S. Provisional Patent Application No. 63/401,823, which was filed on Aug. 29, 2022, and is hereby incorporated by reference in its entirety.

FEDERALLY SPONSORED RESEARCH OR DEVELOPMENT

This invention was made with government support under N00014-17-1-2546 awarded by the Office of Naval Research. The government has certain rights in the invention.

TECHNICAL FIELD

The present disclosure relates generally to optical fibers and more particularly to a fluorosilicate optical fiber for luminescence thermometry.

BACKGROUND

Temperature sensors, or thermometers, are critical tools in a wide range of applications, across nearly all fields, and come in a variety of forms. Optical, or luminescence-based, thermometry has recently shown great promise for a wide range of applications. Often, these systems incorporate optically pumped quantum dots (QDs) as the sources of light due to the strong dependence of both the peak emission wavelength and intensity on temperature, but such systems are limited to point sensing. Optical fibers including rare earth dopants have also been proposed for luminescence-based thermometry, but the rare earth-doped fibers tend to have a low sensitivity to temperature. Thus, a different framework for temperature sensing would be advantageous.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Described in this disclosure is a new approach to luminescence thermometry. Alkaline-earth fluorosilicate optical fibers are fabricated to include defects capable of emitting intense green light when pumped by infrared (IR) radiation. Because the emission is a very strong function of temperature, the optical fibers may be employed for optical thermometry. As shown in the examples below, the intense green emission can be generated by IR pumping with commercial, off-the-shelf laser diodes operating at a power level less than 1 W. Since the IR light used for pumping cannot be detected with the human eye, the green emission can serve as a basis for visual temperature sensing, akin to a hybrid of night and thermal vision. Since the intensity of the luminescence (but not its peak wavelength) is found to decrease with temperature, with proper calibration the optical fiber can provide the foundation of an imaging-based distributed sensing platform. In addition to exhibiting changes in light intensity with temperature, the fibers may also exhibit changes in upper state (excited state) lifetime with temperature, and thus either approach may be used for luminescence thermometry.

Figure 1:
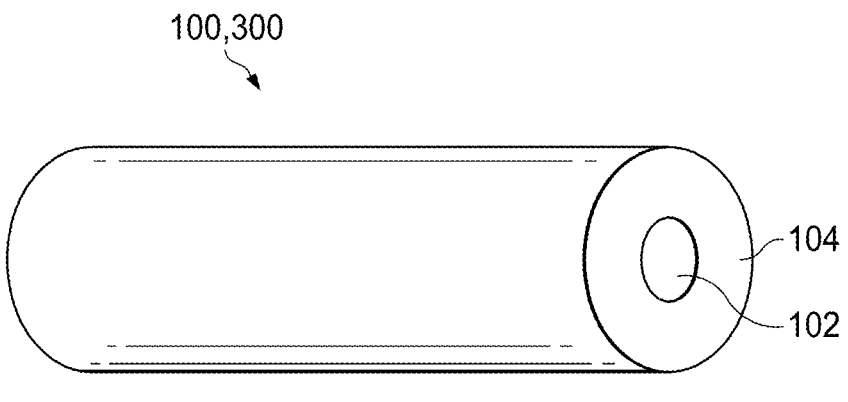
FIG. 1 is a schematic of a temperature sensor comprising an optical fiber having a core comprising an alkaline-earth fluorosilicate glass including defects and a cladding comprising a silica glass.
Figure 2:
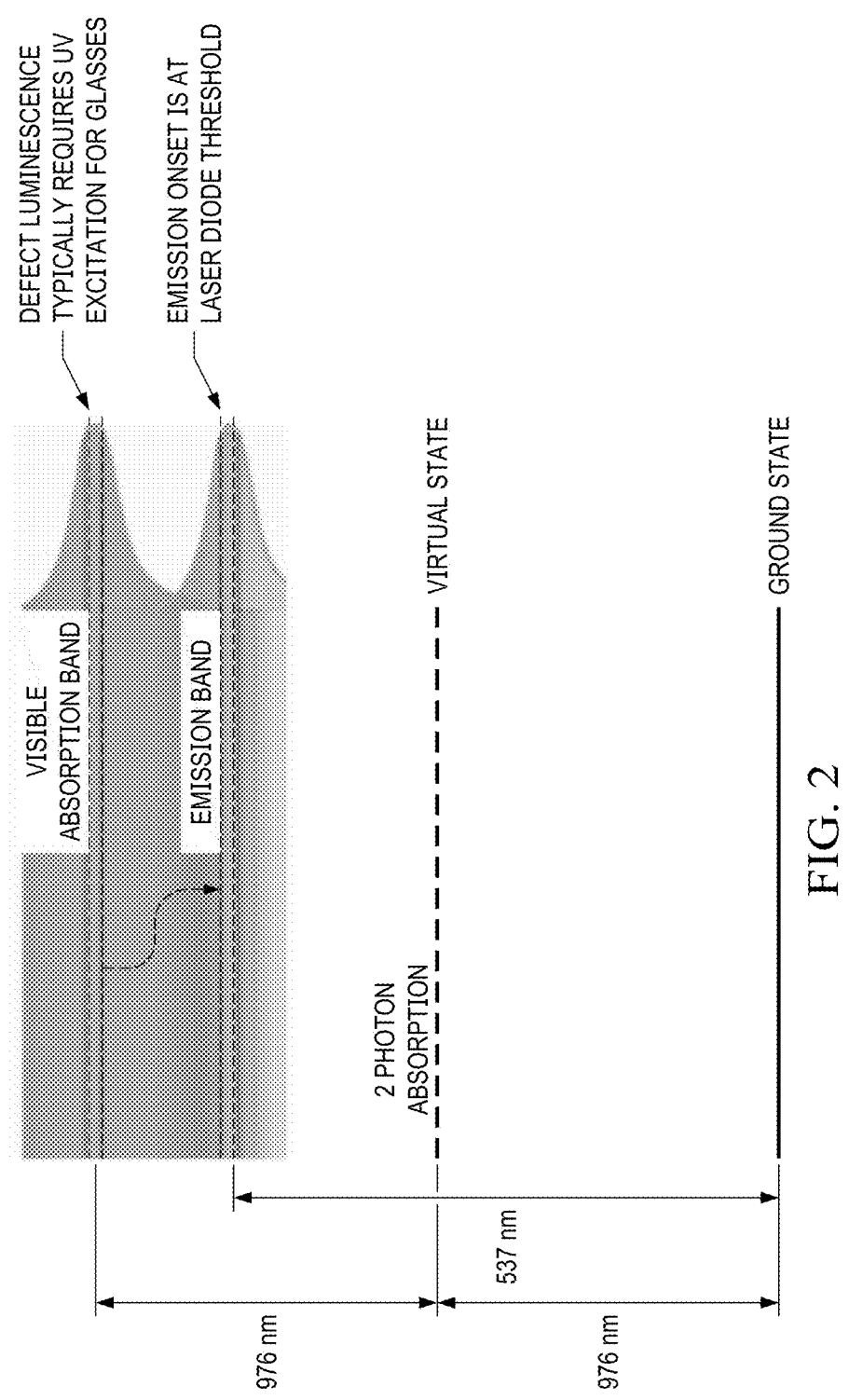
FIG. 2 is a schematic illustrating electronic excitation or pumping of the defects in the alkaline-earth fluorosilicate glass.
Figure 3A:
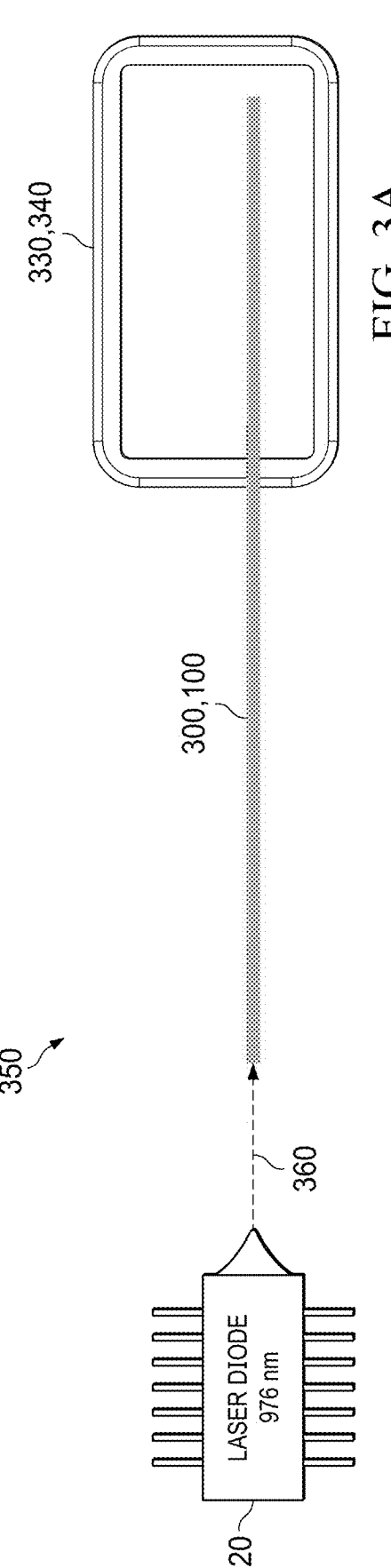
FIG. 3A is a schematic illustrating an exemplary temperature measuring system.
Figure 3B:
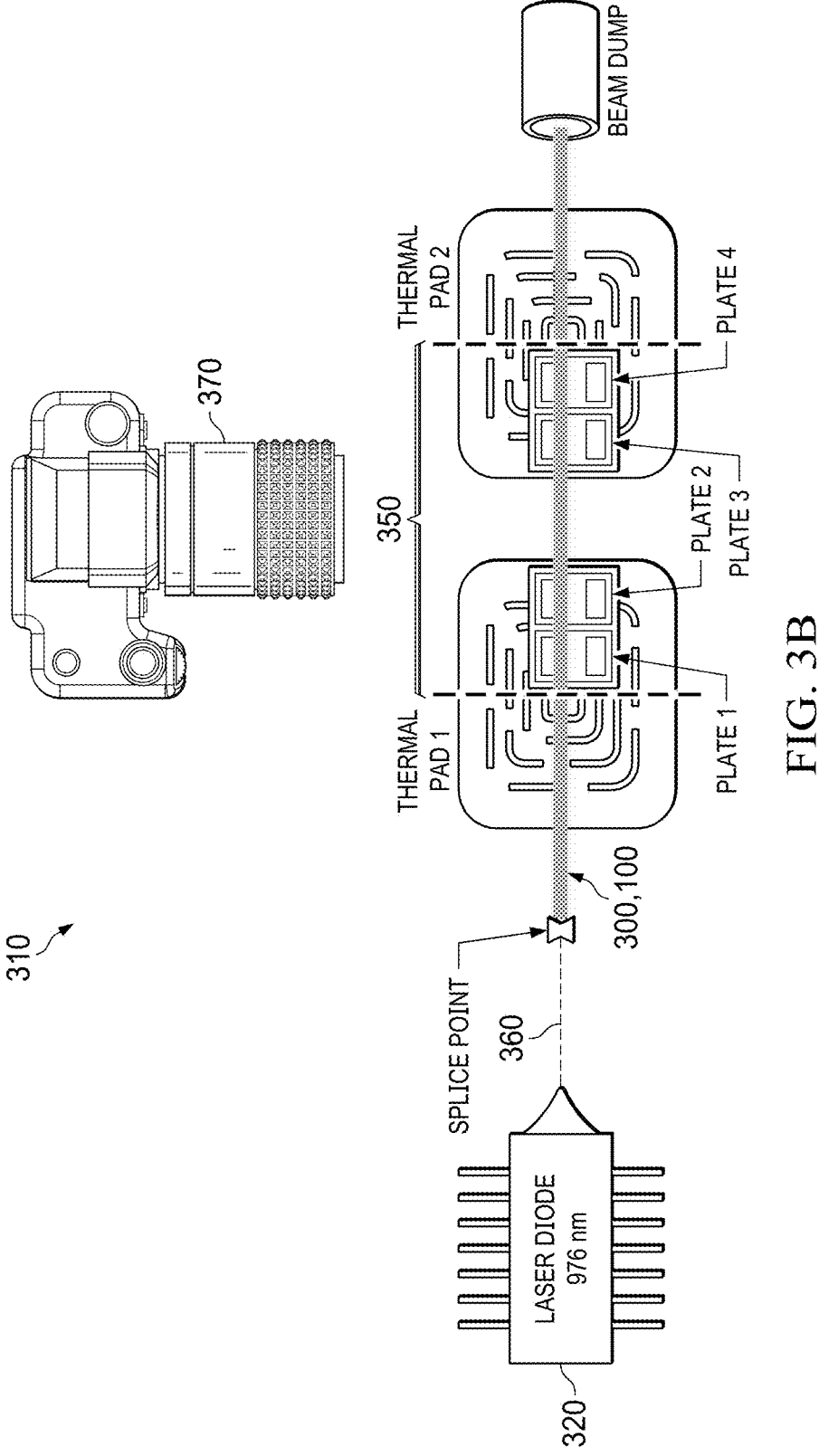
FIG. 3B is a schematic illustrating another exemplary temperature measuring system.

FIG. 1 is a schematic of such an optical fiber 100 comprising a core 102 surrounded by a cladding 104, where the core 102 comprises an alkaline-earth fluorosilicate glass including defects, and the cladding 104 comprises a silica glass. When electronically excited by, or pumped with, IR light, as illustrated in FIG. 2 for an exemplary wavelength of 976 nm, the defects emit green light at an intensity dependent on temperature and which may be sufficient (e.g., at least about $10^{-10}$ W/m$^2$) to be detected unaided by the human eye. The two-photon absorption process believed to be required for pumping is found to be very efficient, giving rise to emission that is visible with the naked eye even under room light conditions. Based on the intensity of the green emission, it is speculated that the defects, which may alternately be referred to as glass defects, are present at a high concentration in the fluorosilicate glass. Preferably, the number density, or concentration, is at least around $1\times10^{21}$ m$^{-3}$, and preferably greater than $1\times10^{23}$ m$^{-3}$. Due to the temperature dependence of the green light emission, the optical fiber 100 may function as a temperature sensor 300, as illustrated in FIGS. 3A and 3B and as discussed further below.

The defects may include silica defects, such as non-bridging oxygen hole centers, which are generated in silica glass in the presence of alkaline earth species during fabrication of the optical fiber. As described below, the optical fiber may be fabricated utilizing the molten core method (MCM). A silica defect may be understood to be an interruption of the amorphous structure of silica, which includes a network of $SiO_4$ tetrahedra where each oxygen atom is bonded to (or "bridges" between) two silicon atoms, and each silicon atom is bonded to four oxygen atoms. Various types of defects may be present in the silica or silicate glass, including paramagnetic and diamagnetic defects, such as the non-bridging oxygen hole centers mentioned above (represented by $\equiv$Si—O·, where the symbol $\equiv$ represents bonding to three oxygens and the symbol · represents an unpaired electron, i.e., a dangling bond), E' centers (represented by $\equiv$Si·, where the symbol $\equiv$ represents bonding to three oxygens and the symbol · represents an unpaired electron, i.e., a dangling bond), peroxy radicals (represented by $\equiv$Si—O—O·), oxygen deficient network linkages such as type I oxygen deficiency centers (represented by $\equiv$Si—Si$\equiv$), and/or oxygen-excess peroxy linkages (represented by $\equiv$Si—O—O—Si$\equiv$). Other defects may include self-trapped excitons (STEs), silanone defects (=Si=O), and dioxasilyrane groups (=Si(O2)), and/or the diamagnetic silylene oxygen divacancy (=Si:). The defects are present within the core and distributed along a length of the optical fiber; preferably, the defects are uniformly distributed along the length.

Figure 4:
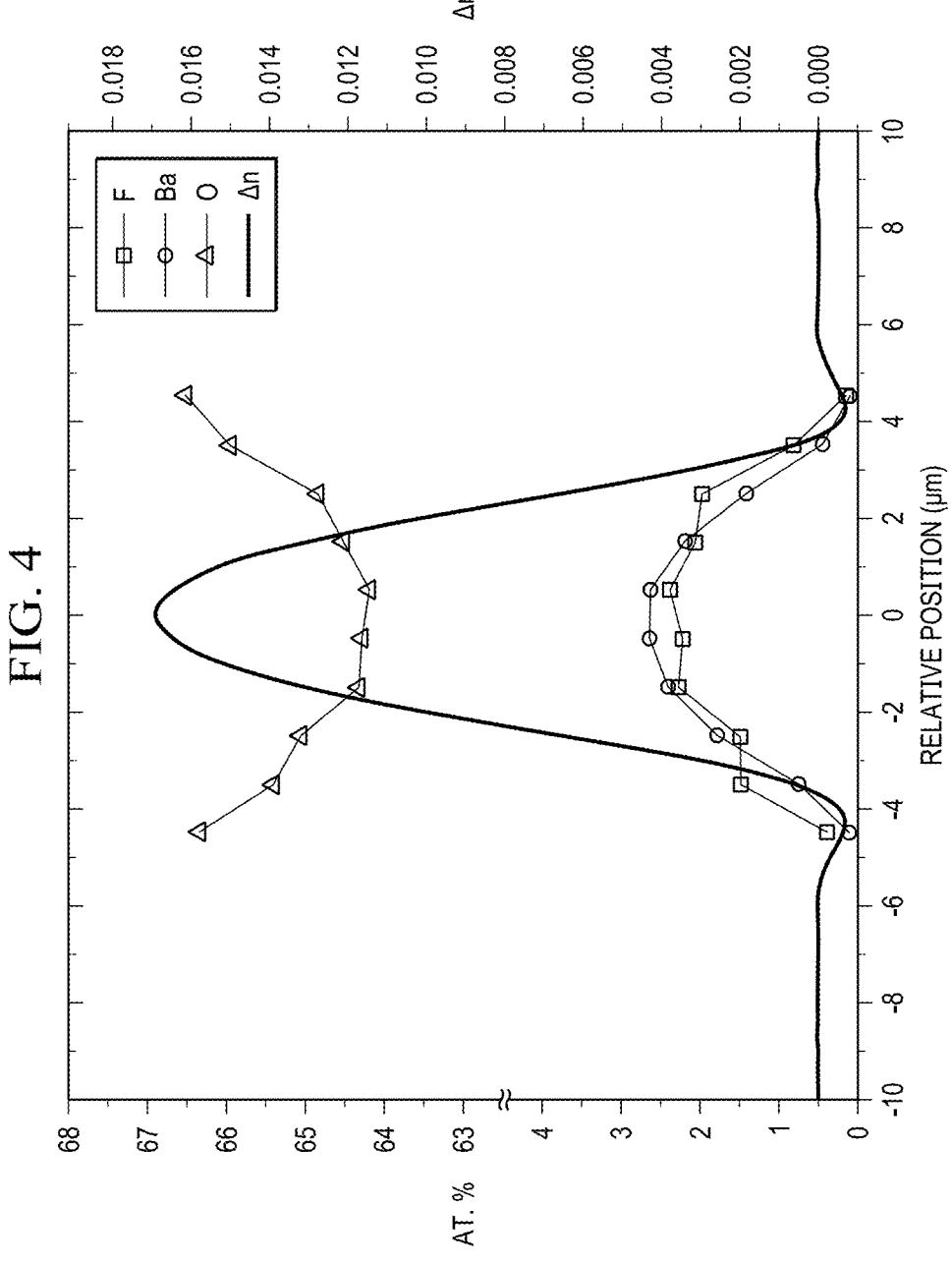
FIG. 4 shows a concentration profile (except for silicon) and the relative refractive index profile for part of a transverse cross-section of an exemplary optical fiber.

The alkaline-earth fluorosilicate glass may include only (or "consist of") an alkaline-earth metal, fluorine, silicon, oxygen, and any incidental impurities. In one example (e.g., see FIG. 4), the composition of the alkaline earth fluorosilicate glass, measured at a center of the core of the optical fiber, may consist of the alkaline-earth metal at a concentration in a range from about 2-3 at. %, the fluorine at a concentration in a range from about 1.5-2.5 at. %, the oxygen at a concentration in a range from about 63.5-65 at. %, and the incidental impurities at a concentration no greater than about 1000 ppm, or no greater than about 100 ppm, where the silicon accounts for a balance of the composition. More generally speaking, the alkaline-earth metal and the fluorine may each be present at a concentration in a range from about 1 at. % to about 10 at. %, and the oxygen may be present at a concentration from about 60 at. % to about 70 at. %, with incidental impurities at a concentration no higher than about 1000 ppm or no higher than about 100 ppm, and the silicon accounting for the balance of the composition. The alkaline earth metal may comprise Mg, Ca, Sr and/or Ba. Due to the MCM fabrication of the optical fiber, the alkaline earth fluorosilicate glass may exhibit a composition gradient between the center 106 of the core 102 and a core-cladding interface 108. Referring to FIGS. 1 and 4, which shows a composition profile through part of a transverse cross-section of an exemplary optical fiber 100, it can be seen that the concentration of the alkaline earth metal and the concentration of the fluorine decrease in a direction away from the center 106 of the core 102, whereas the concentration of the oxygen and the concentration of the silicon (not shown) increase.

Importantly, the alkaline-earth fluorosilicate glass does not include a rare earth dopant, such as ytterbium or erbium, which is normally associated with optical fiber luminescence. The alkaline-earth fluorosilicate glass may also or alternatively be devoid of any crystalline regions that may be optically pumped, such as quantum dots, nanocrystals, or microcrystals. That is, the alkaline-earth fluorosilicate glass may be fully amorphous. Accordingly, the green luminescence is attributable to defects, such as those described above, in the alkaline-earth fluorosilicate glass. The alkaline-earth fluorosilicate glass may be intentionally devoid of alumina ($Al_2O_3$), which may hinder the green emission.

A method of measuring temperature that utilizes the alkaline earth fluorosilicate optical fiber 100 described in this disclosure is now explained.

Referring again to FIG. 3A, the method includes positioning the optical fiber 100 (temperature sensor 300) in contact with an object or in an environment 350 having a temperature to be determined. As described above in reference to FIG. 1, the optical fiber 100 includes a core 102 surrounded by a cladding 104, where the core 102 comprises an alkaline-earth fluorosilicate glass including defects and the cladding 104 comprises a silica glass. Once in position, infrared light 360 from a light source 320 such as a laser diode is supplied to the optical fiber 100, and consequently the defects in the alkaline-earth fluorosilicate glass are pumped with, or electronically excited by, the infrared light 360. Typically, the infrared light has a wavelength in a range from about 976 nm to 1070 nm.

Green light emitted from the defects as a consequence of the electronic excitation is detected. The intensity value of green light emission may be sufficient to be detected unaided by the human eye; that is, the intensity value may be at least about $10^{-10}$ W/m$^2$. In practice, the green light may be detected using a light sensor, such as a complementary metal-oxide semiconductor (CMOS) sensor or a charge coupled device (CCD) sensor, which may be part of a smartphone camera 330 or a traditional camera 370, such as the Nikon D3400 used in the experimental set-up described below. The intensity value associated with the green light emission may be determined using signal processing software or a suitable image processing app 340. Calibration data are used to convert the intensity value of the green light to a temperature value for the optical fiber. The calibration data may take the form of a calibration curve, such as that shown in FIG. 9. Consequently, the temperature of the object or environment 350 may be determined.

In the experimental configuration of FIG. 3B, a camera 370 (e.g., a Nikon D3400) is used to obtain images of an optical fiber 100 comprising a barium fluorosilicate glass to demonstrate another potential thermometry system 310. In this example, the optical fiber 100 (temperature sensor 300) is seated on small base plates which are on top of two ceramic thermal pads at different temperatures. The length (0.65 m) of the optical fiber 100 is selected so as to cover the camera field-of-view when situated about 0.75 m above the fiber 100.

Given the form factor of the optical fiber 100, the green light may be detected along a length of the optical fiber 100. Consequently, the intensity value may be one of a plurality of intensity values determined along the length of the optical fiber 100. In such an example, the calibration data or curve is used to convert the plurality of intensity values to a plurality of temperature values along the length of the fiber 100, such that a distributed measurement of the temperature of the environment or object 350 may be obtained. The temperature may be determined over a wide range, for example, from about −269° C. to about 130° C., or higher. Above about 130° C., the green light emission intensity may be insufficient for visual detection, as may be observed by the top-view images of an IR-pumped optical fiber in FIG. 5, which were taken by a camera at optical fiber temperatures of 25° C., 50° C., 70° C., 90° C., 110° C. and 130° C. However, in other examples, higher defect concentrations and consequently higher intensities may be achieved, such that the temperature may be determined at higher temperatures, such as up to 150° C., or up to 200° C. The temperature dependence of the green defect emission may be associated with a sizeable electron-phonon coupling coefficient. The effect of temperature is fully reversible and suggests that the optical fiber may function as a sensor with a long operating lifetime.

Figure 6:
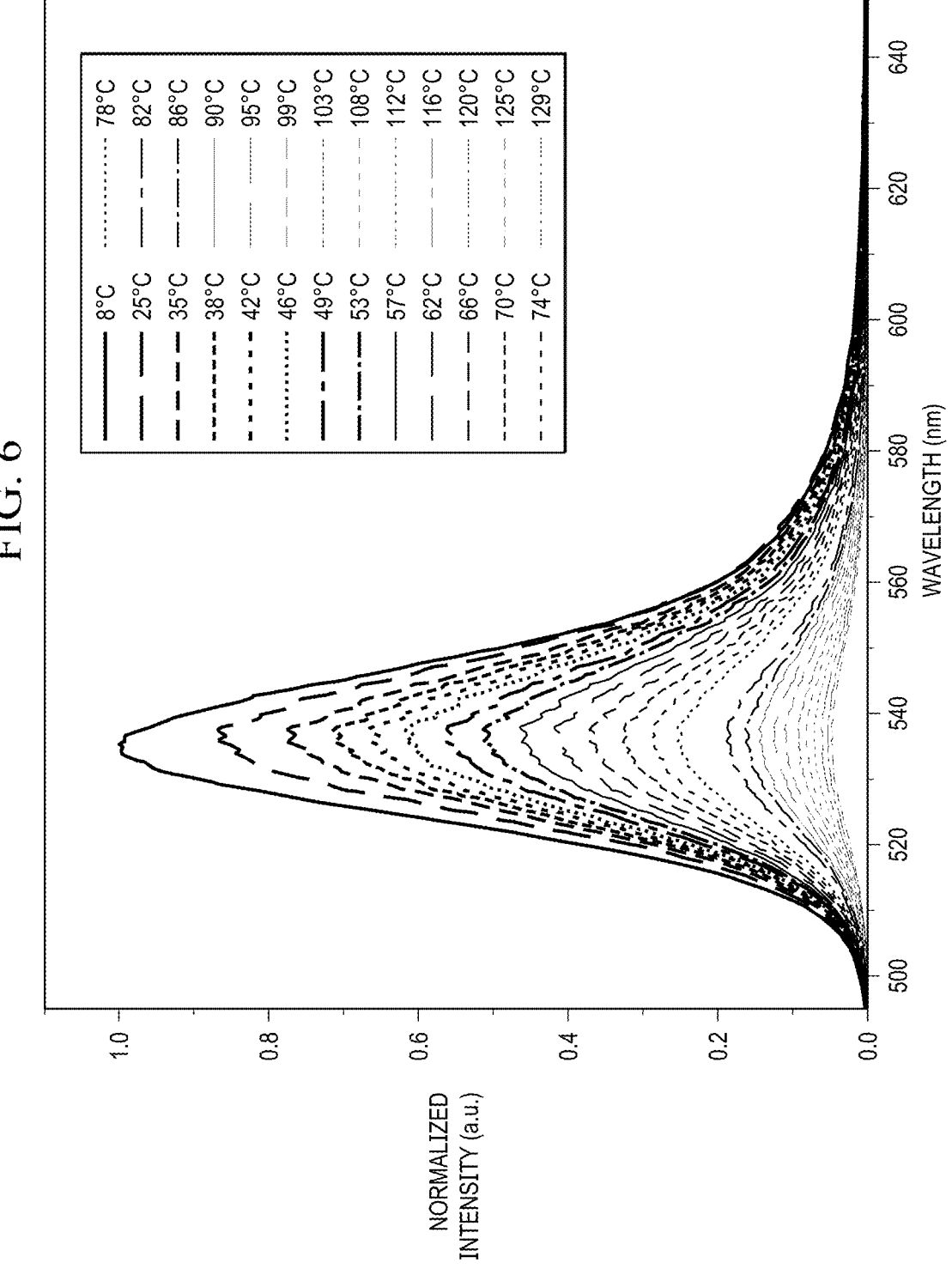
FIG. 6 shows emission spectra for an IR-pumped optical fiber heated to a range of temperatures from 25° C. to 129° C.

An emission spectrum of the green light may exhibit a peak intensity value at a wavelength in a range from about 530 nm to about 545 nm, or in a range from about 535 nm to about 540 nm, as can be observed from the data of FIG. 6, which are plots of emission spectra for an optical fiber heated to a range of temperatures from 25° C. to 129° C. Notably, the wavelength of the peak intensity value exhibits little to no change as a function of temperature, in contrast to the intensity, which increases as the temperature decreases. The emission spectrum has an asymmetric Gaussian shape. More specifically, the emission spectrum may have a Pekarian shape, which is associated with glass defects.

The method may further include, prior to positioning the optical fiber 100 in contact with the object or in the environment 350, calibrating the optical fiber 100 to obtain the calibration data needed to convert the intensity value(s) to temperature value(s). Calibration of the optical fiber 100 may be carried out as described in the example below.

Figure 9:
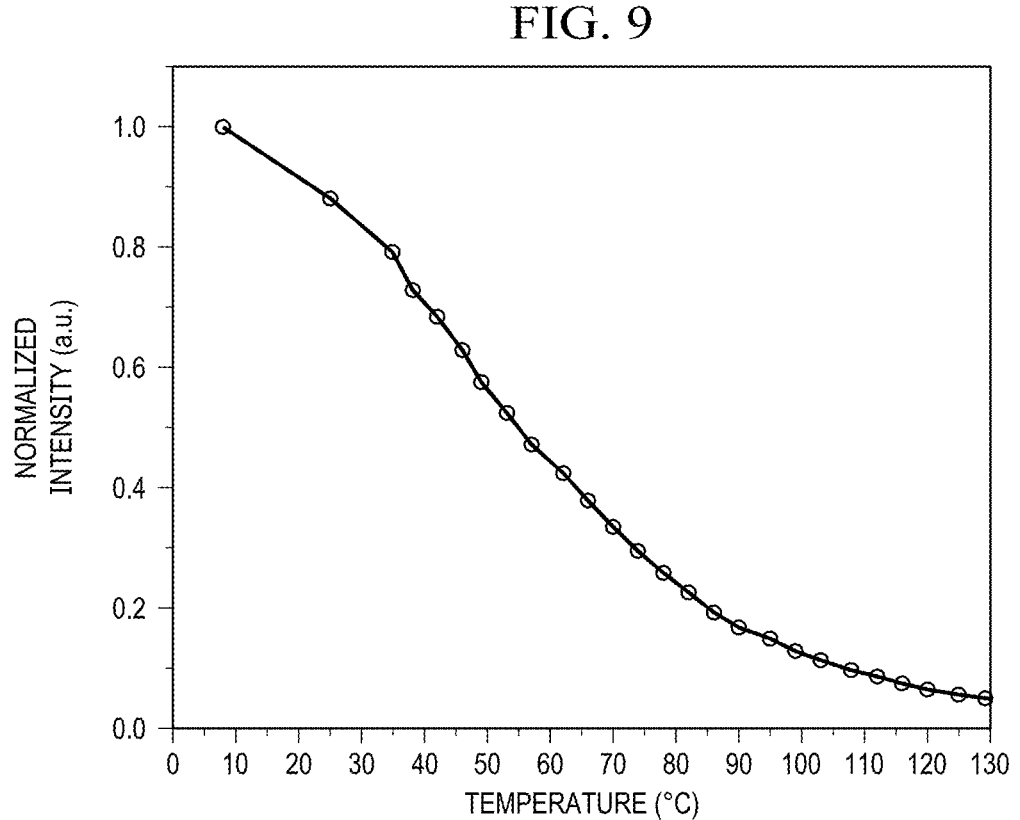
FIG. 9 shows calibration data (normalized intensity versus temperature) for an exemplary optical fiber.

Accordingly, a temperature measuring system 310 may include, again referring to FIG. 3A: the temperature sensor 300 or optical fiber 100 as described according to any example or embodiment in this disclosure; a light source 320 configured to supply infrared light 360 to the optical fiber 100; a light sensor 330 (e.g., in a camera or a smartphone camera) configured to detect optical light (e.g., green light) emitted from the optical fiber 100; signal processing software 340 configured to determine an intensity value of the optical light; and calibration data (e.g., as shown in FIG. 9) for converting the intensity value to a temperature value. Intensity values and consequently temperature values may be determined along the length of the optical fiber 100, thereby providing a distributed measurement of temperature. The above-described system and method may find use in applications in biology, physics and electronics. Other applications may include dosimetry. The fiber may also be combined with other sensor platforms (such as fiber Bragg gratings or Rayleigh scattering) for lab-on-fiber measurement systems.

Figure 7:
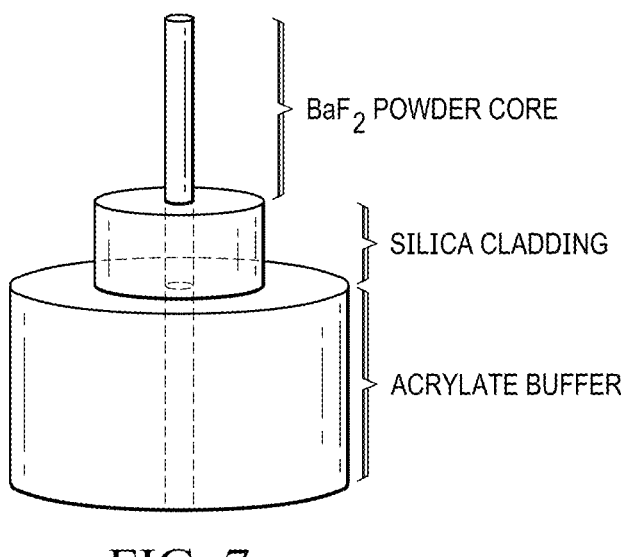
FIG. 7 is a schematic of the configuration to fabricate the optical fiber using the molten core method (MCM).

As indicated above, the optical fiber may be fabricated using the MCM or molten core method of fabrication. Referring to FIG. 7, the method may entail inserting a powder consisting of an alkaline earth metal and fluorine (e.g., $BaF_2$ in this example) into a silica tube or cladding, and, after inserting the powder, heating the silica tube to a temperature sufficient to induce melting of the powder. The alkaline earth metal and the fluorine may be present as an alkaline earth fluoride having a chemical formula $MF_2$, where M represents the alkaline earth metal (e.g., Mg, Ca, Sr, or Ba) and F represents fluorine; that is, the powder may consist of the alkaline earth fluoride. It is noted that the melting temperatures of $MgF_2$, $BaF_2$, $CaF_2$ and $SrF_2$ are 1263° C., 1368° C., 1418° C., and 1477° C., respectively; thus, in some examples, the temperature to which the silica tube is heated may be at least about 1300° C., at least about 1400° C., or at least about 1500° C. To promote a suitable viscosity for drawing the silica, the temperature may be at least about 1900° C. and is more typically in the range from about 1925° C. to about 1950° C. Accordingly, the temperature may be as high as 1950° C. or as high as 2000° C. While heated, the silica tube is reduced in diameter (or drawn) to form a drawn cylindrical body including a molten core region in which diffusion and/or chemical reactions occur, leading to defect formation. A polymer (e.g., acrylate or polyimide) coating may be applied over the silica cladding during the draw for increased mechanical strength and glass protection. An experimental example of a MCM process is described below. A final outer diameter of the optical fiber 100, including the polymer coating, may lie in a range from about 150 μm to about 300 μm. The core 102 may have a diameter in a range from about 2 μm to about 80 μm, and/or the cladding 104 may extend to an outer diameter in a range from about 115 μm to about 135 μm.

The drawn cylindrical body is then cooled to solidify the molten core region, thereby forming an optical fiber 100 comprising a core 102 surrounded by a cladding 104, as described above, where the core 102 comprises an alkaline-earth fluorosilicate glass including defects and the cladding 104 comprises a silica glass.

Example

Fiber Fabrication

Fabrication of an exemplary temperature sensing optical fiber comprising an alkaline-earth fluorosilicate that is nominally passive—i.e., does not include any rare earth dopants—by the molten core method (MCM) is described. In this example, a precursor composed of high purity (99.998%) $BaF_2$ powder was packed into a telecommunications grade silica tube with an inner diameter of 3.0 mm and an outer diameter of 30 mm. The silica tube serves as the cladding and was pre-sealed on one end. This preform was drawn into fiber (125 μm target outer diameter) at a temperature of approximately 2000° C. using a commercial Heathway tower at Clemson University. At these temperatures the precursor is molten, and the silica glass softens and diffuses into the core region, yielding a $BaF_2$—$SiO_2$ mixture. The $BaF_2$ then progressively oxidizes to form BaO, with F being partially volatilized. Under the right conditions, the driving chemical processes leave behind an extraordinarily high concentration of silica related defects. The high draw temperature allows for a core that is free of any large-scale phase separation (and resulting optical scattering loss) considered to be caused by the liquid-liquid immiscibility region between the silica and the alkaline earth precursor. An acrylate coating for increased mechanical strength and glass protection was also applied during the draw, giving a final outer diameter of 250 μm.

Several samples were collected along the fiber draw length and are investigated herein. Scanning electron microscope (SEM) imaging and energy dispersive x-ray (EDX) analysis was performed on the fiber cores to monitor glass composition across the core. At the beginning of the draw, fluorine content was higher than at the end of the draw (2.4 at. % versus 1.0%) and significantly higher than what is possible with standard chemical vapor deposition (CVD) fabrication techniques (nominally 1 At. % or lower). Results from EDX for the sample collected from the beginning of the draw are provided in FIG. 4. Finally, the refractive index profile (RIP), also provided in FIG. 4, was measured at 950 nm (Interfiber Analysis, LLC), using a spatially resolved Fourier transform technique.

Calibration and Temperature Testing

Figure 8:
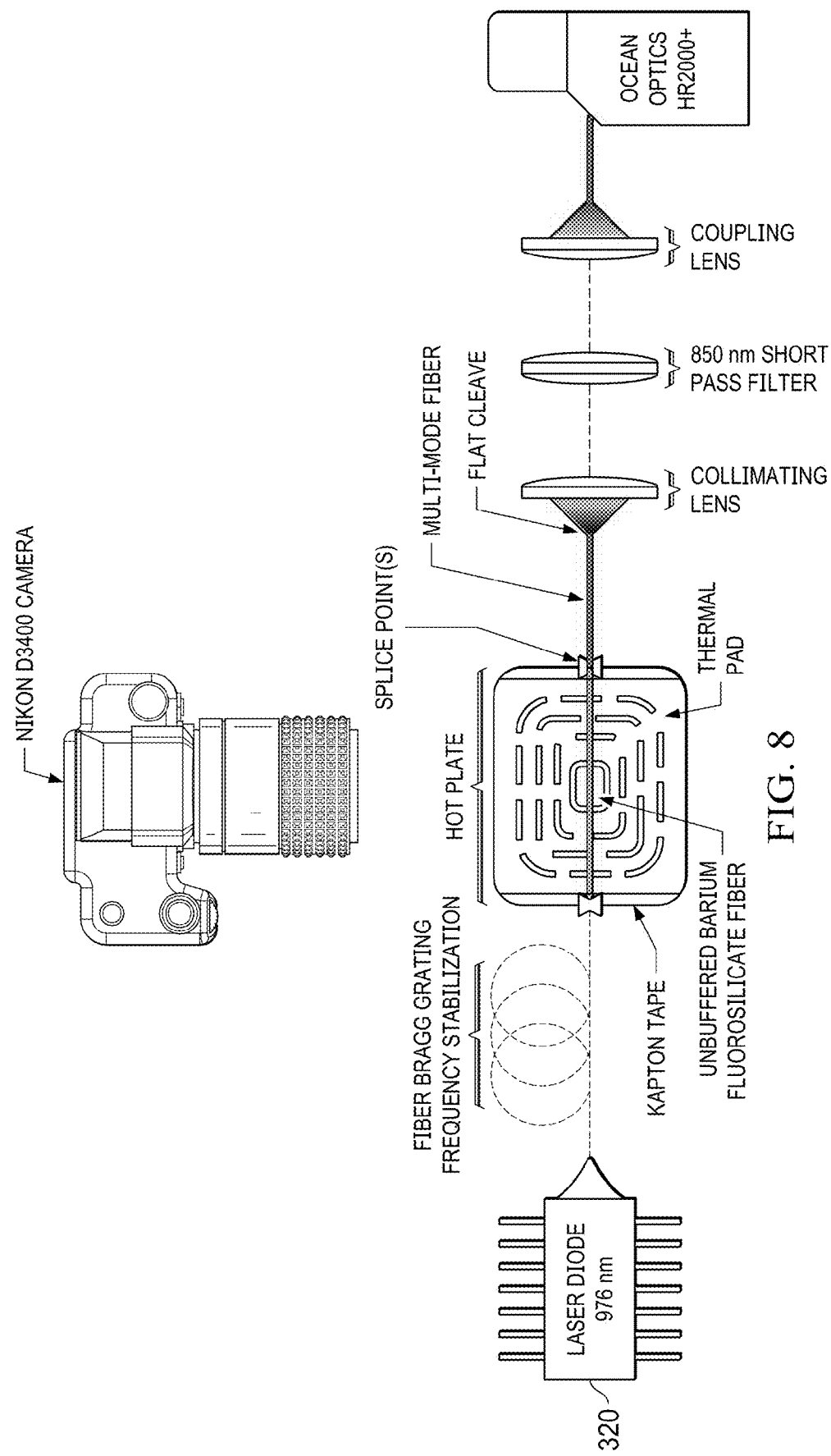
FIG. 8 is a schematic of an exemplary setup for calibration of the optical fiber.

The experimental setup (not to scale) is shown schematically in FIG. 8. To perform temperature testing and calibration, a 14.4 cm segment of barium fluorosilicate (BFS) fiber was stripped of its buffer (i.e., acrylate coating) and placed on a hot plate (12.7 cm by 17.8 cm, Corning PC-420D). The length of fiber was selected in order to cover a majority of the hot plate's horizontal dimension. The BFS fiber was directly pumped with 590 mW from a fiber Bragg grating-stabilized laser diode at 976 nm (JDSU, now Lumentum, S31-7602-720). A segment of bufferless sacrificial fiber was spliced to the pump's pigtail and then to the BFS fiber to avoid damage to the pump fiber upon heating. The other end of the BFS fiber was spliced to 13.6 cm of commercial multimode fiber (Corning® 62.5/125) that also has 2.5 cm of buffer removed immediately after the splice point. The end of the multimode fiber was then flat-cleaved and placed within a side loading fiber chuck (Thorlabs HFC007) and the output collimated with an aspheric lens, filtered of any remaining pump light using an 850 nm shortpass filter (Thorlabs FESH0800), and coupled into a large diameter fiber patch cable connected to an Ocean Optics (now Ocean Insight) UV-enhanced high-resolution VIS-NIR spectrometer (HR2000+).

To ensure a near uniform heat distribution across the fiber, a thermally conductive graphite pad (Laird Tgon™ 805) with 200 µm thickness was inserted between the ceramic top of the hot plate and the test fiber and secured with Kapton tape. The BFS sample was then clamped (also with Kapton tape) at both splice points as shown in FIG. 8. To ensure contact with the thermal pad, a second graphite sheet was placed above the fiber and then gently compressed at the corners of the heating surface. The true surface temperature was verified via a handheld thermal imaging camera (FLIR E5). After the spectral data was taken, the top graphite sheet was removed for direct imaging of the luminescence across the entire sample. For this, a standard Nikon camera (D3400) was placed directly above the test sample. All data were taken using the same sample since the luminescence intensity at room temperature remained constant after heat treatment. In other words, the effects of temperature are fully reversible.

Upper state lifetime measurements for the observed green luminescence were obtained via pulse pumping with a 976 nm diode laser. The entire test sample was kept pressed against the surface of a hot plate in a manner mimicking that of the setup seen in FIG. 8 and followed by a short segment of multimode fiber for light delivery. The resulting output was flat-cleaved, placed inside a temporary bare fiber terminator (Thorlabs BFT1), and collimated. The output beam was then sent through a pair of 650 nm cutoff shortpass filters and focused onto a Si avalanche photodiode (Thorlabs APD410A2). Given the signal weakness as the fiber temperature is increased and responsivity in the visible detector range, the gain was set to near maximum for convenience and experimental precautions were taken to reduce noise from room lights accordingly. The fall time in the measurement system is <100 ns.

Results

FIG. 6 provides the emission spectrum from the optical fiber as a function of hot plate temperature, which may be understood to represent the fiber temperature. Noticeably, while the peak emission wavelength shifts very little, its intensity is shown to decrease significantly with increasing temperature. First, it is important to note that emission from an impurity rare earth (such as $Er^{3+}$) or other material has been definitively ruled out as the source of the observed green luminescence. Indeed, the green emission band has a classic asymmetric Pekarian-like lineshape often attributed to glass defects. The strong temperature dependence of the intensity also is typical of defects where the electron-phonon coupling is strong. Although the spectral width is much narrower in the present case, these defects may resemble those typically observed at the surface of silica.

FIG. 9 quantifies the relative intensity as a function of temperature, showing an asymptotic response at higher temperatures. Even though the response is not linear across the entire investigated temperature range, FIG. 9 serves as a calibration curve for the temperature response of the system. Note that, while not attempted here, it is expected that the luminescence continues to increase at temperatures below 25° C.

Figure 5:
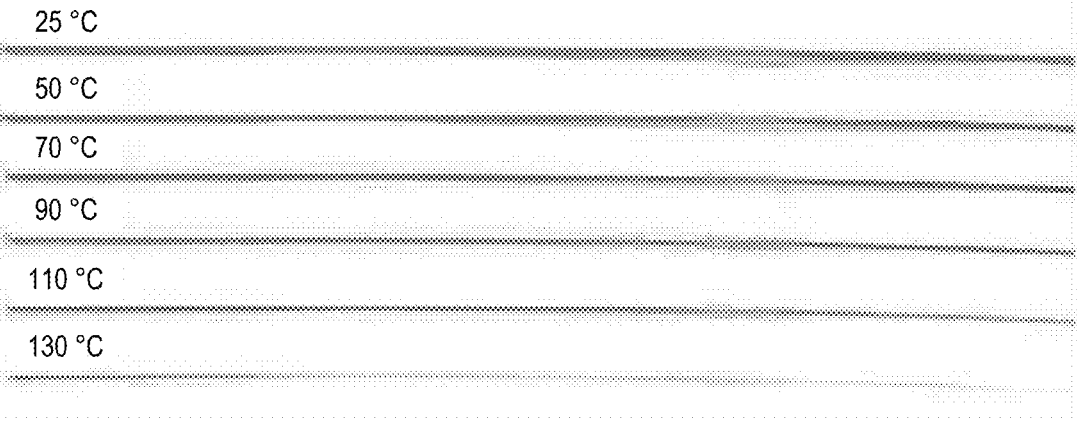
FIG. 5 shows top-view images of an infrared (IR)-pumped optical fiber taken by a camera at fiber temperatures of 25° C., 50° C., 70° C., 90° C., 110° C. and 130° C.

Assuming proper system calibration, a standard CMOS or CCD camera, which may be found in a smartphone, can be used in an imaging scheme. To demonstrate how a standard camera could be used in combination with the sensing fiber, images of the IR-pumped BFS at roughly 20° C. intervals were taken to show the clear decrease in luminescence, as shown in FIG. 5. An intensity linescan through the image, along with appropriate signal processing, allows for a distributed measurement of fiber temperature.

Figure 10:
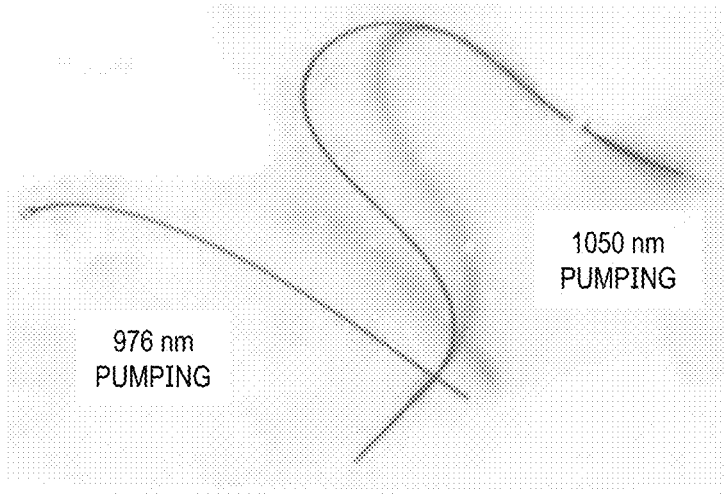
FIG. 10 shows intense green emission from IR-pumped optical fibers at two different pump wavelengths, 976 nm and 1050 nm.

It is further noted that, while a wavelength of 976 nm was used to excite the green luminescence, there is flexibility in pumping wavelength. To illustrate this visually, optical fiber images were recorded and are shown in FIG. 10 with excitation wavelengths of 976 nm and 1050 nm. To appreciate how bright these are to the naked eye, take note of the light reflected from the optical table below the optical fibers.

Figure 11:
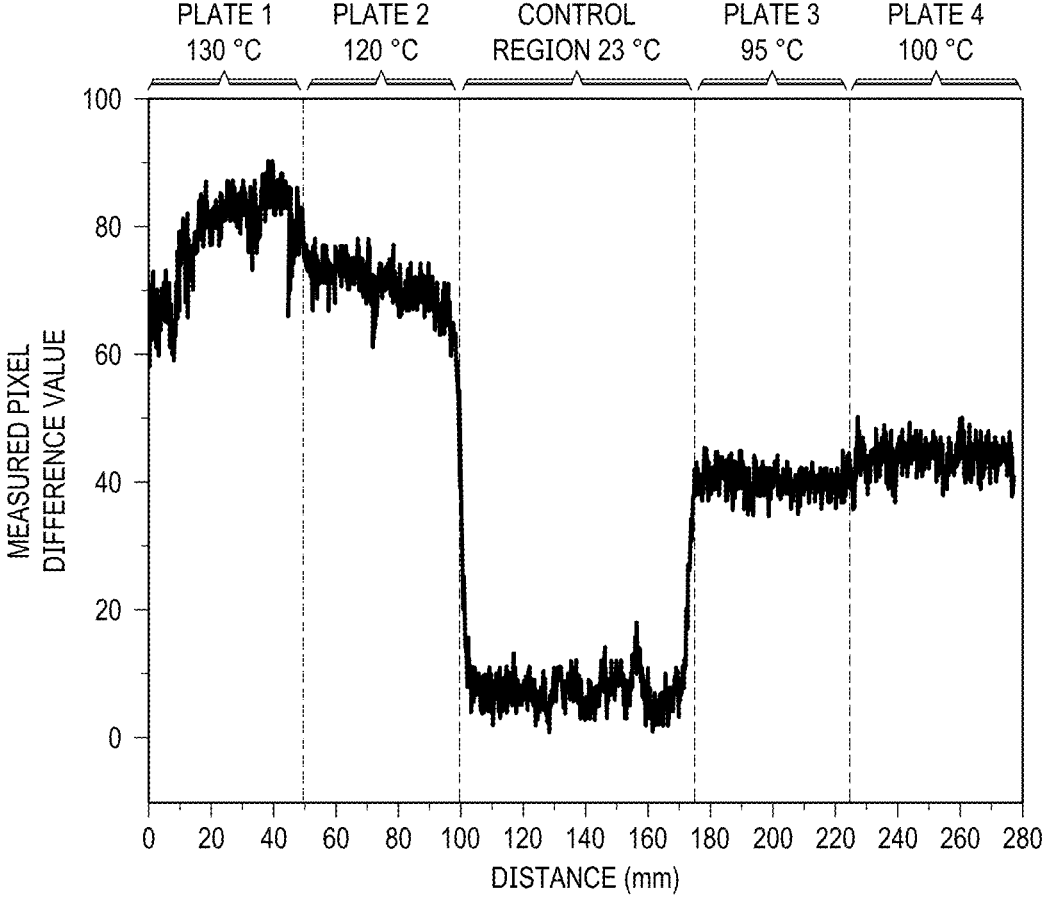
FIG. 11 plots results representing the region of optical fiber between the dashed lines in FIG. 3B; the plot shows differential pixel values from high temperature to ambient room temperature across two separate thermal plates, with two baseplates positioned on each pad. The large variation in the first plate may stem from poor thermal contact between the sample fiber and the base plate.

Through use of the CMOS camera 370 and the setup 310 in FIG. 3B, images from an optical fiber 100 undergoing temperature variation along its length were obtained. These results are shown in FIG. 11, where the four individual base plates sitting on top of two different thermal pads displayed their own change in luminescence intensity. The plot was obtained via a differential measurement where the high-temperature data was subtracted from that at ambient-room conditions. A maximum relative sensitivity of 1.13% $K^{-1}$ was obtained, and the maximum temperature resolution was found to be 4.12 K at 95° C. A theoretical maximum spatial resolution of 0.14 mm for a large temperature change of 95° C. to 23° C. was also calculated. Of note, the spatial resolution was limited by thermal diffusion between the different heated regions, resulting in a spatial resolution of 4.8 mm for the same temperature difference. Furthermore, the absolute resolution and sensitivity for the sensing medium are dependent on a given camera's exposure time and ISO settings. In this instance, an exposure time of 2 seconds was used with minimized ISO settings. As such, the temperature sensitivity is believed to be limited by the camera used in these experiments.

Figure 12A:
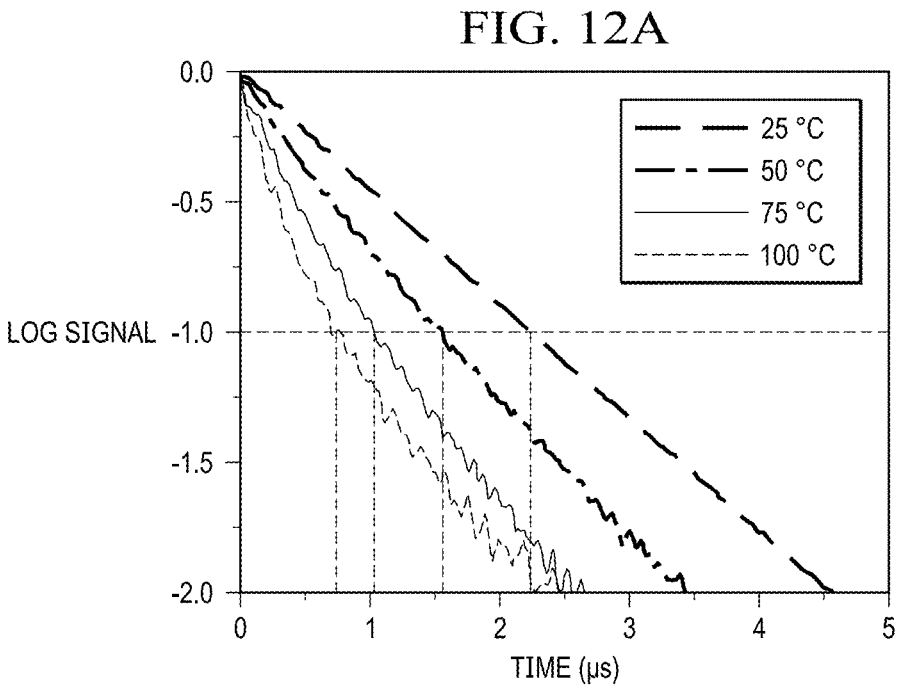
FIG. 12A shows a comparison of upper-state lifetime decay on log scale.
Figure 12B:
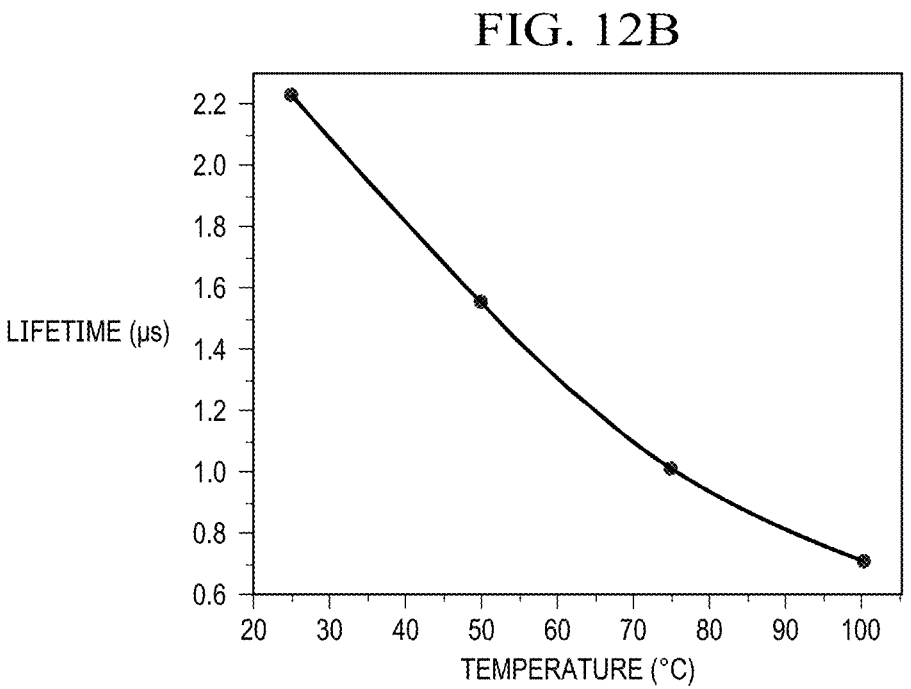
FIG. 12B shows measured 1/e lifetimes, which decrease with increasing temperature.

The upper-state lifetime measurements at 25° C. intervals from room temperature are shown on a log scale in FIG. 12A. The lifetimes pinpointed in FIG. 12A are summarized below in Table 1. The maximum relative sensitivity of this temporal approach was found to be 2.85% $K^{-1}$ at 100° C. The seemingly nonlinear response at higher temperatures beyond the first e-folding is a result of the decreased intensity of the luminescence (see FIG. 9) resulting in greater noise for the detection system. Notably, the emission lifetimes are not-dependent on power, as they were within uncertainty for each temperature, and have been found to be independent of length at room temperature. The draw position was found to have minimal impact as results from either end of draw produced similar emission lifetimes. As seen in FIG. 12B, the lifetime as a function of temperature mirrors that of the peak intensity in that, at higher temperatures, the data is asymptotic towards a minimum luminescence that is outside the verifiable temperature range tested here. This could act as a responsivity curve for determining the temperature, given a calibration against the ambient room temperature.

TABLE 1

| Green Luminescence Temperature-dependent Lifetimes | |
| --- | --- |
| Temperature (° C.) | Lifetime (μs) |
| 25 | 2.230 ± 0.025 |
| 50 | 1.550 ± 0.025 |
| 75 | 1.015 ± 0.025 |
| 100 | 0.710 ± 0.025 |

The subject-matter of the disclosure may also relate, among others, to the following aspects:

A first aspect relates to an optical fiber for temperature sensing, the optical fiber comprising: a core surrounded by a cladding, the core comprising an alkaline-earth fluorosilicate glass including defects, and the cladding comprising a silica glass, wherein, when pumped with infrared light, the defects emit green light at an intensity dependent on a temperature of the optical fiber.

A second aspect relates to the optical fiber of the preceding aspect, wherein the defects include silica defects.

A third aspect relates to the optical fiber of the preceding aspect, wherein the silica defects include non-bridging oxygen hole centers, E centers, peroxy radicals, oxygen deficient network linkages, oxygen-excess peroxy linkages, self-trapped excitons, silanones, dioxasilyrane groups and/or diamagnetic silylene oxygen divacancies.

A fourth aspect relates to the optical fiber of any preceding aspect, wherein a number density or concentration of the defects in the alkaline-earth fluorosilicate glass is at least about $1\times10^{21}$ $m^{-3}$, or at least about $1\times10^{23}$ $m^{-3}$.

A fifth aspect relates to the optical fiber of any preceding aspect, wherein the alkaline-earth fluorosilicate glass consists of: an alkaline earth metal; fluorine; silicon; oxygen; and incidental impurities.

A sixth aspect relates to the optical fiber of the preceding aspect, wherein the alkaline earth metal is selected from the group consisting of Ba, Ca, Mg, and Sr.

A seventh aspect relates to the optical fiber of the fifth or sixth aspect, wherein a composition of the alkaline earth fluorosilicate glass at a center of the core consists of: the alkaline-earth metal at a concentration in a range from about 1-10 at. %; the fluorine at a concentration in a range from about 1-10 at. %; the oxygen at a concentration in a range from about 60-70 at. %; and the incidental impurities at a concentration no greater than about 1000 ppm, wherein the silicon accounts for a balance of the composition.

An eighth aspect relates to the optical fiber of any of the fifth through the seventh aspects, wherein the alkaline earth fluorosilicate glass exhibits a composition gradient between a center of the core and a core-cladding interface.

A ninth aspect relates to the optical fiber of the preceding aspect, wherein, in a direction away from the center of the core, a concentration of the alkaline earth metal and a concentration of the fluorine decrease, and a concentration of the silicon and a concentration of the oxygen increase.

A tenth aspect relates to the optical fiber of any preceding aspect, wherein the alkaline-earth fluorosilicate glass does not include a rare earth dopant.

An eleventh aspect relates to the optical fiber of any preceding aspect, wherein the alkaline-earth fluorosilicate glass does not include quantum dots, nanocrystals, or microcrystals.

A twelfth aspect relates to the optical fiber of any preceding aspect, wherein the alkaline-earth fluorosilicate glass does not include alumina ($Al_2O_3$).

A thirteenth aspect relates to the optical fiber of any preceding aspect, wherein the defects are distributed along a length of the optical fiber.

A fourteenth aspect relates to the optical fiber of any preceding aspect, wherein the core has a diameter in a range from about 2 μm to about 80 μm, and/or wherein the cladding extends to an outer diameter in a range from about 115 μm to about 135 μm.

A fifteenth aspect relates to the optical fiber of any preceding aspect, further comprising a polymer coating on the cladding.

A sixteenth aspect relates to the optical fiber of any preceding aspect, wherein a final outer diameter of the optical fiber, including the polymer coating, lies in a range from about 150 μm to about 300 μm.

A seventeenth aspect relates to the optical fiber of any preceding aspect, wherein the intensity of the green light is at least about $10^{-10}$ $W/m^2$.

An eighteenth aspect relates to the optical fiber of any preceding aspect, being formed by a molten core method (MCM).

A nineteenth aspect relates to a system for measuring temperature, the system comprising: the optical fiber of any preceding aspect; a light source configured to supply infrared light to the optical fiber; a light sensor configured to detect optical light emitted from the optical fiber; signal processing software configured to determine an intensity value of the detected optical light; and calibration data for converting the intensity value to a temperature value.

A twentieth aspect relates to a method of measuring temperature, the method comprising: positioning an optical fiber in contact with an object or in an environment having a temperature to be determined, the optical fiber comprising a core surrounded by a cladding, the core comprising an alkaline-earth fluorosilicate glass including defects, and the cladding comprising a silica glass; supplying infrared light to the optical fiber, thereby electronically exciting the defects; detecting green light emitted from the defects as a consequence of the electronic excitation; and determining an intensity value of the green light; and using calibration data to convert the intensity value of the green light to a temperature value for the optical fiber, thereby determining the temperature of the object or the environment.

A twenty-first aspect relates to the method of the preceding aspect, wherein the intensity value is sufficient to be detected unaided by a human eye.

A twenty-second aspect relates to the method of the preceding aspect, wherein the intensity value is at least about $10^{-10}$ $W/m^2$.

A twenty-third aspect relates to the method of any preceding aspect, wherein the intensity value of the green light increases as the temperature decreases.

A twenty-fourth aspect relates to the method of any preceding aspect, wherein the temperature is in a range from about −269° C. to about 200° C.

A twenty-fifth aspect relates to the method of any preceding aspect, wherein the intensity value is one of a plurality of intensity values determined along the length of the optical fiber, and wherein the calibration data are used to convert the plurality of intensity values to a plurality of temperature values along the length of the optical fiber, thereby obtaining a distributed measurement of the temperature of the object or the environment.

A twenty-sixth aspect relates to the method of any preceding aspect, wherein a laser diode supplies the infrared light directed through the optical fiber.

A twenty-seventh aspect relates to the method of any preceding aspect, wherein the infrared light has a wavelength in a range from about 976 nm to about 1070 nm.

A twenty-eighth aspect relates to the method of any preceding aspect, wherein an emission spectrum of the green light has an asymmetric Gaussian shape.

A twenty-ninth aspect relates to the method of any preceding aspect, wherein an emission spectrum of the green light has a Pekarian shape.

A thirtieth aspect relates to the method of any preceding aspect, wherein an emission spectrum of the green light has a peak intensity value at a wavelength in a range from about 530 nm to about 545 nm, or in a range from about 535 nm to about 540 nm.

A thirty-first aspect relates to the method of any preceding aspect, wherein the wavelength of the peak intensity value is independent of temperature.

A thirty-second aspect relates to the method of any preceding aspect, wherein the green light is detected using a light sensor selected from the group consisting of: a complementary metal-oxide semiconductor (CMOS) sensor and a charge coupled device (CCD) sensor.

A thirty-third aspect relates to the method of the preceding aspect, wherein the light sensor is part of a smartphone.

A thirty-fourth aspect relates to the method of any preceding aspect, wherein the intensity value is determined using signal processing software.

A thirty-fifth aspect relates to the method of any preceding aspect, further comprising, prior to positioning the optical fiber in contact with the object or in the environment, calibrating the optical fiber to obtain the calibration data.

A thirty-sixth aspect relates to the method of any preceding aspect utilizing the optical fiber of any preceding aspect.

A thirty-seventh aspect relates to a method of making an optical fiber, the method comprising: inserting a powder consisting of an alkaline earth metal and fluorine into a silica tube; after inserting the powder, heating the silica tube to a temperature sufficient to induce melting of the powder; drawing the silica tube to form a drawn cylindrical body including a molten core region in which diffusion and/or chemical reactions occur, leading to defect formation; and cooling the drawn cylindrical body to solidify the core, thereby forming an optical fiber, the core comprising an alkaline-earth fluorosilicate glass including defects, and the cladding comprising a silica glass.

A thirty-eighth aspect relates to the method of the preceding aspect, wherein the temperature to which the silica tube is heated is at least about 1900° C.

A thirty-ninth aspect relates to the method of the thirty-seventh or thirty-eighth aspect, wherein the alkaline earth metal and the fluorine are present as an alkaline earth fluoride having a chemical formula $MF_2$, where M represents the alkaline earth metal and F represents fluorine.

A fortieth aspect relates to the method of any of the thirty-seventh through the thirty-ninth aspects, further comprising, prior to drawing, applying a polymer coating over the cladding.

A forty-first aspect relates to the method of any of the thirty-seventh through the fortieth aspects, wherein the optical fiber formed has any feature recited in any preceding aspect.

Although the present invention has been described in considerable detail with reference to certain embodiments thereof, other embodiments are possible without departing from the present invention. The spirit and scope of the appended claims should not be limited, therefore, to the description of the preferred embodiments contained herein.

All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. An optical fiber for temperature sensing, the optical fiber comprising:
    a core surrounded by a cladding, the core comprising an alkaline-earth fluorosilicate glass including defects, and the cladding comprising a silica glass,
    wherein, when pumped with infrared light, the defects emit green light at an intensity dependent on a temperature of the optical fiber.

2. The optical fiber of claim 1, wherein the defects include silica defects selected from the group consisting of non-bridging oxygen hole centers, E centers, peroxy radicals, oxygen deficient network linkages, oxygen-excess peroxy linkages, self-trapped excitons, silanones, dioxasilyrane groups, and diamagnetic silylene oxygen divacancies.

3. The optical fiber of claim 1, wherein a number density or concentration of the defects in the alkaline-earth fluorosilicate glass is at least about $1 \times 10^{21}$ m³.

4. The optical fiber of claim 1, wherein the alkaline-earth fluorosilicate glass consists of:
    an alkaline earth metal selected from the group consisting of Ba, Ca, Mg, and Sr;
    fluorine;
    silicon;
    oxygen; and
    incidental impurities.

5. The optical fiber of claim 4, wherein a composition of the alkaline earth fluorosilicate glass at a center of the core consists of:
    the alkaline-earth metal at a concentration in a range from about 1-10 at. %;
    the fluorine at a concentration in a range from about 1-10 at. %;
    the oxygen at a concentration in a range from about 60-70 at. %; and
    the incidental impurities at a concentration no greater than about 1000 ppm,
    wherein the silicon accounts for a balance of the composition.

6. The optical fiber of claim 4, wherein the alkaline earth fluorosilicate glass exhibits a composition gradient between a center of the core and a core-cladding interface,
    wherein, in a direction away from the center of the core, a concentration of the alkaline earth metal and a concentration of the fluorine decrease, and a concentration of the silicon and a concentration of the oxygen increase.

7. The optical fiber of claim 1, wherein the alkaline-earth fluorosilicate glass does not include a rare earth dopant,
    wherein the alkaline-earth fluorosilicate glass does not include quantum dots, nanocrystals, or microcrystals, and/or
    wherein the alkaline-earth fluorosilicate glass does not include alumina ($Al_2O_3$).

8. The optical fiber of claim 1, wherein the defects are distributed along a length of the optical fiber.

9. The optical fiber of claim 1, wherein the intensity of the green light is at least about $10^{-10}$ W/m².

10. A system for measuring temperature, the system comprising:

the optical fiber of claim 1;

a light source configured to supply infrared light to the optical fiber;

a light sensor configured to detect optical light emitted from the optical fiber;

signal processing software configured to determine an intensity value of the detected optical light; and calibration data for converting the intensity value to a temperature value.

11. A method of measuring temperature, the method comprising:

positioning an optical fiber in contact with an object or in an environment having a temperature to be determined, the optical fiber comprising a core surrounded by a cladding, the core comprising an alkaline-earth fluoro-silicate glass including defects, and the cladding comprising a silica glass;

supplying infrared light to the optical fiber, thereby electronically exciting the defects;

detecting green light emitted from the defects as a consequence of the electronic excitation; and determining an intensity value of the green light; and using calibration data to convert the intensity value of the green light to a temperature value for the optical fiber, thereby determining the temperature of the object or the environment.

12. The method of claim 11, wherein the intensity value of the green light increases as the temperature decreases.

13. The method of claim 11, wherein the temperature is in a range from about −269° C. to about 200° C.

14. The method of claim 11, wherein the intensity value is one of a plurality of intensity values determined along the length of the optical fiber, and wherein the calibration data are used to convert the plurality of intensity values to a plurality of temperature values along the length of the optical fiber, thereby obtaining a distributed measurement of the temperature of the object or the environment.

15. The method of claim 11, wherein an emission spectrum of the green light has an asymmetric Gaussian shape.

16. The method of claim 11, wherein an emission spectrum of the green light has a Pekarian shape.

17. The method of claim 11, wherein the infrared light has a wavelength in a range from about 976 nm to about 1070 nm.

18. The method of claim 11, wherein the wavelength of the peak intensity value is independent of temperature.

19. The method of claim 11, wherein the green light is detected using a light sensor selected from the group consisting of: a complementary metal-oxide semiconductor (CMOS) sensor and a charge coupled device (CCD) sensor.

20. A method of making an optical fiber, the method comprising:

inserting a powder consisting of an alkaline earth metal and fluorine into a silica tube;

after inserting the powder, heating the silica tube to a temperature sufficient to induce melting of the powder;

drawing the silica tube to form a drawn cylindrical body including a molten core region in which diffusion and/or chemical reactions occur, leading to defect formation; and cooling the drawn cylindrical body to solidify the core, thereby forming an optical fiber, the core comprising an alkaline-earth fluorosilicate glass including defects, and the cladding comprising a silica glass.

* * * * *